United States Patent
Lee

(10) Patent No.: US 9,883,070 B2
(45) Date of Patent: Jan. 30, 2018

(54) IMAGE READING APPARATUS AND METHOD OF CONTROLLING THE SAME

(71) Applicant: S-Printing Solution Co., Ltd., Suwon-si, Gyeonggi-do (KR)

(72) Inventor: Do-soon Lee, Suwon-si (KR)

(73) Assignee: S-Printing Solution Co., Ltd., Suwon-si (KR)

( * ) Notice: Subject to any disclaimer, the term of this patent is extended or adjusted under 35 U.S.C. 154(b) by 0 days.

(21) Appl. No.: 15/287,072

(22) Filed: Oct. 6, 2016

(65) Prior Publication Data

US 2017/0118372 A1 Apr. 27, 2017

(30) Foreign Application Priority Data

Oct. 22, 2015 (KR) .......................... 10-2015-0147293

(51) Int. Cl.
*G06F 15/00* (2006.01)
*H04N 1/32* (2006.01)
*H04N 1/00* (2006.01)

(52) U.S. Cl.
CPC ..... *H04N 1/32042* (2013.01); *H04N 1/00846* (2013.01); *H04N 1/00872* (2013.01); *H04N 1/00875* (2013.01); *H04N 1/32117* (2013.01); *H04N 2201/0094* (2013.01)

(58) Field of Classification Search
CPC ........... H04N 1/32042; H04N 1/00846; H04N 1/00875; H04N 1/00872; H04N 1/32117

USPC ....................................................... 358/1.14
See application file for complete search history.

(56) References Cited

U.S. PATENT DOCUMENTS

| | | |
|---|---|---|
| 2004/0267759 A1* | 12/2004 | Shimizu ............ G06F 17/30879 |
| 2005/0050331 A1 | 3/2005 | Skurdal et al. |
| 2007/0002338 A1 | 1/2007 | Kim |
| 2008/0304088 A1 | 12/2008 | Tomihisa |
| 2010/0060912 A1 | 3/2010 | Kang |
| 2010/0171986 A1* | 7/2010 | Amorosa ............ G06F 21/6209 358/1.16 |
| 2014/0293317 A1 | 10/2014 | Xu |

FOREIGN PATENT DOCUMENTS

| | | |
|---|---|---|
| JP | 2008-080745 A | 4/2008 |
| JP | 2014-198379 A | 10/2014 |
| KR | 10-0691468 B1 | 3/2007 |
| KR | 10-2010-0030059 A | 3/2010 |

* cited by examiner

*Primary Examiner* — Saeid Ebrahimi Dehkord
(74) *Attorney, Agent, or Firm* — Jefferson IP Law, LLP

(57) ABSTRACT

An image reading apparatus and a control method thereof are provided. The image reading apparatus includes a communication device configured to perform communication in a preset communication manner, a scanner configured to generate a scan image by scanning a manuscript, and at least one processor configured to control the communication device to transmit use information of the manuscript to an address corresponding to authorship information in response to a preset security pattern including the authorship information being detected in the generated scan image.

16 Claims, 11 Drawing Sheets

FIG. 4

SECURITY OPTION

410 — SECURITY PATTERN TYPE
- ☐ WATER MARK — 411
- ☐ RESTRICT — 412
- ☐ PASSWORD — 413

420 — SECURITY PATTERN POSITION DESIGNATION

— 421

430 — AUTHORSHIP INFORMATION
- 431 — FAX NO. [ ]
- 432 — E-mail [ ]
- 433 — PHONE NO. [ ]

440 — COPY RESTRICTION PERIOD
15.10.01 ~ 15.10.31

[ CONFIRM ]  [ CANCEL ]

IMAGE READING APPARATUS AND METHOD OF CONTROLLING THE SAME

CROSS-REFERENCE TO RELATED APPLICATION(S)

This application claims under 35 U.S.C. § 119(a) of a Korean patent application filed on Oct. 22, 2015 in the Korean Intellectual Property Office and assigned Serial number 10-2015-0147293, the entire disclosure of which is hereby incorporated by reference.

TECHNICAL FIELD

The present disclosure relates to an image reading apparatus and a method of controlling the same. More particularly, the present disclosure relates to an image reading apparatus which performs a document security function and a method of controlling the same.

BACKGROUND

The image reading apparatuses may be an apparatus which scans an original image such as text, a picture, or a film and convert the original image to digital data. The digital data may be generated as an output image through display in a monitor of a computer or through printing by a printer. A scanner, a copier, a facsimile, a multi-function peripheral (MFP), which multiply realizes functions of the scanner, the copier, and the facsimile through one apparatus, and the like may be typically an example of the image reading apparatus.

In recent years, image reading apparatuses which perform a security function have been emerged. For example, the image reading apparatus may perform a security operation which outputs a document requiring the security by applying a security pattern to the document and blocks copying of the document including the security pattern in response to the document including the security pattern being detected.

However, according to the security pattern in the related art being applied, the security pattern may be unconditionally applied to the whole document region and thus the security pattern may be output in an undesired portion of the document content. Therefore, there is a need for a method for applying the security pattern only to a desired portion of the document content.

Since the security pattern is used for simply blocking the copying and the like, the utilization of the security pattern is limited, and thus there is a need for various document security methods using the security pattern.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an image reading apparatus which performs various document security functions and a control method thereof.

In accordance with an aspect of the present disclosure, an image reading apparatus is provided. The image reading apparatus includes a communication device configured to perform communication in a preset communication manner, a scanner configured to generate a scan image by scanning a manuscript, and at least one processor configured to control the communication device to transmit use information of the manuscript to an address corresponding to authorship information in response to a preset security pattern including the authorship information being detected in the generated scan image.

The use information of the manuscript may include at least one among information for the manuscript, information for a user using the manuscript, information for a use time of the manuscript, information for the scanner, information for indicating whether or not a copy of the manuscript is created, and information for a number of copies of the manuscript.

The image reading apparatus may further include a printer configured to output the scan image. The at least one processor may further be configured to transmit the use information of the manuscript in response to the scan image in which the preset security pattern including the authorship information is being output through the printer.

The at least one processor may further be configured to perform a security operation corresponding to a type of the detected security pattern.

The at least one processor may further be configured to perform the security operation only in a period corresponding to copy restriction period information in response to the copy restriction period information being included in the detected security pattern.

The image reading apparatus may further include a printer configured to output the scan image. The at least one processor may further be configured to control the printer to output no scan image in response to a first type of the detected security pattern, output the scan image in which a density of the security pattern is darker in response to a second type of the detected security pattern, and output the scan image in response to a third type of the detected security pattern and authentication information corresponding to the detected security pattern being input.

The image reading apparatus may further include a display configured to display a user interface (UI) screen for receiving the authentication information. The at least one processor may further be configured to control the display to display the UI screen in response to the detected third type of the security pattern.

The address may include at least one among an internet protocol (IP) address, a media access control (MAC) address, an electronic mail (e-mail) address, and a phone number.

The image reading apparatus may further include an input unit (or input device) configured to receive a security option and a printer configured to output print data. The at least one processor may further be configured to generate the print data by inserting the preset security pattern corresponding to the received security option into the scan image generated by scanning a loaded manuscript and control the printer to output the generated print data.

The security option may include at least one among a security pattern type, a security pattern inserting position, the authorship information, and copy restriction period information.

The at least one processor may further be configured to output no generated print data in response to a toner amount available in the image reading apparatus being less than a preset amount.

In accordance with another aspect of the present disclosure, a method of controlling an image reading apparatus is provided. The method includes generating a scan image by scanning a manuscript, and transmitting use information of the manuscript to an address corresponding to authorship information in response to a preset security pattern including the authorship information being detected in the scan image.

The use information of the manuscript may include at least one among information for the manuscript, information for a user using the manuscript, information for a use time of the manuscript, information for the scanner, information for indicating whether or not a copy of the manuscript is created, and information for the number of copies of the manuscript.

The transmitting of the use information may include transmitting the use information of the manuscript in response to the scan image in which the preset security pattern including the authorship information is being output through a printer of the image reading apparatus.

The method may further include performing a security operation corresponding to a type of the detected security pattern.

The performing of the security operation may include performing the security operation only in a period corresponding to copy restriction period information in response to the copy restriction period information being included in the detected security pattern.

The performing of the security operation may include outputting no scan image in response to a first type of the detected security pattern, outputting the scan image in which a density of the security pattern is darker in response to a second type of the detected security pattern, and outputting the scan image in response to a third type of the detected security pattern and authentication information corresponding to the detected security pattern being input.

The performing of the security operation may include displaying a user interface (UI) screen for receiving the authentication information in response to the detected third type of the security pattern.

The method may further include receiving a security option, generating print data by inserting the preset security pattern corresponding to the received security option into the scan image generated by scanning a loaded manuscript, and outputting the generated print data.

In accordance with another aspect of the present disclosure, a non-transitory computer-readable recording medium having recorded thereon at least one program comprising commands, which when executed by a computer, performs a method of controlling an image reading apparatus is provided. The method includes generating a scan image by scanning a manuscript, and transmitting use information of the manuscript to an address corresponding to authorship information in response to a preset security pattern including the authorship information being detected in the scan image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a diagram illustrating a user interface (UI) screen for security setup according to an embodiment of the present disclosure;

Throughout the drawings, it should be noted that like reference numbers are used to depict the same or similar elements, features, and structures.

DETAILED DESCRIPTION

Figure 1:
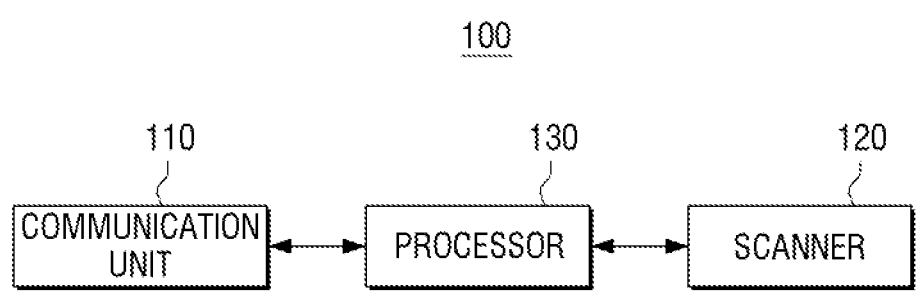
FIG. 1 is a block diagram illustrating a configuration of an image reading apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, like drawing reference numerals are used for the like elements, even in different drawings. The matters defined in the description, such as detailed construction and elements, are provided to assist in a comprehensive understanding of various embodiments. However, various embodiments can be practiced without those specifically defined matters. Also, well-known functions or constructions are not described in detail since they would obscure the application with unnecessary detail.

Terms such as 'first' and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present disclosure. Furthermore, 'and/or' may include any one of or a combination of the components mentioned.

Furthermore, a singular form may include a plural from as long as it is not specifically mentioned in a sentence.

Furthermore, "include/comprise" or "including/comprising" used in the specification represents that one or more components, operations, and elements exist or are added.

In the embodiments of the present disclosure, a 'module' or 'unit' performs at least one function or operation, and may be realized as hardware or software, or a combination thereof. Furthermore, a plurality of 'modules' or a plurality of 'units' may be integrated into at least one module and be realized as at least one processor (not illustrated) except for when they need to be realized as a certain hardware.

Hereinbelow, the present disclosure will be explained in greater detail with reference to the drawing figures.

FIG. 1 is a block diagram illustrating a configuration of an image reading apparatus according to an embodiment of the present disclosure.

Referring to FIG. 1, an image reading apparatus 100 may be an apparatus configured to generate a scan image by scanning a manuscript. For example, the image scanner apparatus 100 may be a scanner, a copier, a facsimile, a multi-function peripheral (MFP), which multiply realizes functions of the scanner, the copier, and the facsimile through one apparatus, and the like.

Referring to FIG. 1, the image reading apparatus 100 may include a communication unit 110, a scanner 120, and a processor 130.

The communication unit 110 may be configured to perform communication in a preset communication manner.

The communication unit 110 may transmit manuscript use information to an authorship of the manuscript. For example, the communication unit 110 may transmit the manuscript use information to the authorship of the manuscript through various methods such as facsimile transmission, electronic mail (e-mail) transmission, text message transmission, and the like.

For example, the communication unit 110 may be configured to couple the image reading apparatus 100 and an external apparatus. The communication unit 110 may be connected to the external apparatus through a local area network (LAN) and an Internet network. The communication unit 110 may be connected to the external apparatus through a universal serial bus (USB) port.

The communication unit 110 may receive a command for performing various jobs such as a printing job, a scanning job, or a facsimile job from a host apparatus (not shown).

For example, the communication unit 110 may receive the printing job execution command including a command for outputting an image into which a security pattern is inserted. In this example, the communication unit 110 may receive a type of the security pattern, a position of the security pattern, authorship information corresponding to the security pattern, copy restriction period information corresponding to the security pattern, and the like.

It has been described that the job execution command is received through the communication unit 110, but the job execution command may be received from the image reading apparatus 100 itself through an operation input unit (not shown) of the image reading apparatus.

The scanner 120 may be configured to generate a scan image by scanning the loaded manuscript. For example, the scanner 120 may be implemented in a flatbed form or an automatic document feeder (ADF) form.

The scanner 120 may generate the scan image according to the received job execution command. For example, the scanner 120 may scan the manuscript according to the job execution command received through the communication unit 110 or the operation input unit.

The processor 130 may control an overall operation of the image reading apparatus 100. The processor 130 may detect whether or not a preset security pattern is presented in the scan image generated in the scanner 120. The method of detecting the security pattern may be performed through various methods of the related art according to the kind of the security pattern. For example, the various methods of the related art such as a template matching manner, an optical character reader (OCR) manner, or a bar code recognition manner may be used, but this is not limited thereto.

The processor 130 may control the communication unit 110 to transmit the use information of the scanned manuscript to an address corresponding to the authorship information in response to the authorship information being included in the detected security pattern.

The use information of the manuscript may include at least one among information for the manuscript, information for a user using the manuscript, information for a use time of the manuscript, information for the image reading apparatus which performs scanning of the manuscript, information for indicating whether or not a copy of the manuscript is created, and information for the number of copies of the manuscript.

For example, the information for the manuscript may include summary information of content included in the manuscript and may be extracted by reading the security pattern. In another example, the scan image itself generated by scanning the manuscript may be the information for the manuscript.

The information for the user using the manuscript may be acquired through the following method. For example, the image reading apparatus may include an identification (ID) card reader (not shown) and the image reading apparatus 100 may be set to operate by reading the ID card through the ID card reader. In response to the security pattern including the authorship information being detected in the scan image of the manuscript, the manuscript use information including the user information corresponding to the read ID card may be transmitted to the address corresponding to the authorship information.

The information for the use time of the manuscript may be a starting time of the scanning of the manuscript or a completion time of a job such as copy output, facsimile transmission, scan image storage, and the like after the scanning of the manuscript.

The information for the image reading apparatus which performs the scanning of the manuscript may include information such as internet protocol (IP) information of the image reading apparatus, a name of the image reading apparatus, an arrangement position of the image reading apparatus, and the like.

The information for indicating whether or not the copy of the manuscript is created may include information for indicating whether or not the manuscript is scanned and then a scanning result is output. For example, after the scanning of the manuscript, the copy may not be output due to non-input of the authentication information. In this example, the information for indicating whether or not the copy of the manuscript is created may include a message indicating that the creating of the copy of the manuscript has failed.

The information for the number of copies of the manuscript may include information for the number of copies created in response to the copying of the manuscript being succeeded.

The address corresponding to the authorship information may include at least one among an IP address, a media access control (MAC) address, an e-mail address, and a phone number. The authorship information may be input while the security pattern is generated. The authorship information input will be described later, in greater detail, with reference to FIG. 4.

The processor 130 may transmit the use information of the manuscript to the address corresponding to the authorship information just in response to the scan image being generated by scanning the manuscript. In another embodiment, the processor 130 may control the communication unit 110 to transmit the use information of the manuscript after the job for the scanned image is completed. The phrase "the job for the scanned image is completed" may refer to completion of various jobs such as "outputting of the copy through a printer (not shown)", "transmitting of the copy through a facsimile", "storing of the copy in a storage position designated by the user", and the like.

The processor 130 may detect various types of security patterns. The processor 130 may perform a security operation corresponding to the type of the detected security pattern. The various types of security patterns will be described below with reference to FIGS. 2 and 3.

Figure 2:
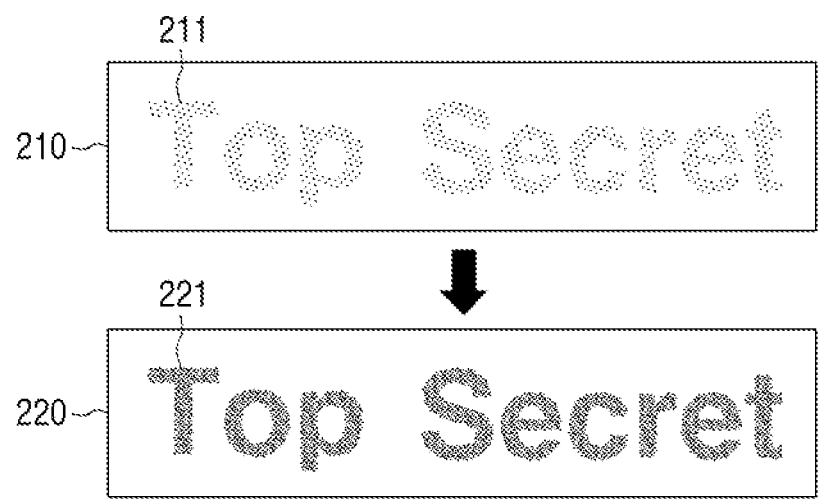
FIGS. 2 and 3 are diagrams illustrating security patterns according to various embodiments of the present disclosure.

FIG. 2 is a diagram illustrating a security pattern according to an embodiment of the present disclosure.

Referring to FIG. 2, the security pattern may be formed in a watermark type.

In response to a watermark type of security pattern 211 being detected in a scan image 210 generated by scanning the manuscript, the processor 130 may generate a copy image 220 including a darker security pattern 221 and output the copy image through the printer of the image reading apparatus. Accordingly, the copy having the security pattern which is more heavily represented than the original security pattern may be output and thus the processor 130 may identify that the corresponding document is not original.

Figure 3:
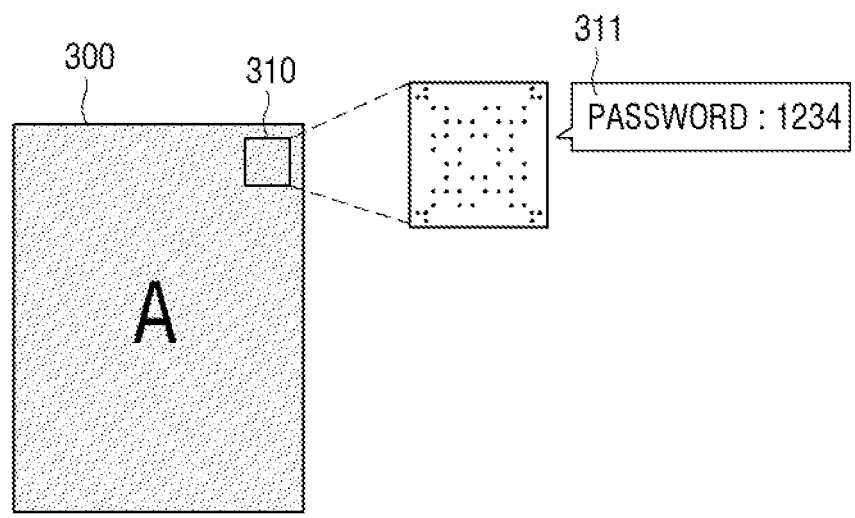

FIG. 3 is a diagram illustrating a security pattern according to another embodiment of the present disclosure.

Referring to FIG. 3, in response to a password type of security pattern 310 included in a scan image 300 generated by scanning a manuscript being detected, the processor 130 may control a printer (e.g., the printer 170 shown in FIG. 6) to output the scan image only in response to authentication information corresponding to the detected security pattern 310 being input. The authentication information may be extracted from the password type of security pattern 310.

For example, the scan image may be output only in response to a password corresponding to the security pattern being input. As illustrated in FIG. 3, the information extracted from the security pattern 310 may include password information 311 and the scan image may be output only in response to the password "1234" being input. The password may be input through an input unit provided in the image reading apparatus 100. In this example, the image reading apparatus 100 may include a display (not shown) and the processor 130 may control the display to display a user interface (UI) screen for receiving the authentication information in response to the password type of security pattern being detected.

In another embodiment, the security pattern may be a copy restriction type. In this example, the processor 130 may not output the scan image in response to the copy restriction type of security pattern included in the scan image generated by scanning the manuscript being detected. That is, the copy restriction type of security pattern may serve to fundamentally blockade the creation of the copy.

The copy restriction period information may be included in the security pattern. The processor 130 may perform the security operations only in a period corresponding to the copy restriction period information in response to the security pattern including the copy restriction period information being detected. For example, with respect to the manuscript including the security pattern including the copy restriction period information that the copy restriction period is set from Oct. 1, 2015 to Oct. 31, 2015, the security operations may be performed in response to the scanning for the manuscript being attempted during the period, but the manuscript may be copied with restriction as a general manuscript after Nov. 1, 2015.

The copy restriction period information may be input while the security pattern is generated. The copy restriction period information input will be described below, in greater detail, with reference to FIG. 4.

The image reading apparatus 100 may receive a security option. The security option may include at least one among a security pattern type, a security pattern inserting position, the authorship information, and the copy restriction period information.

The processor 130 may generate print data by inserting the security pattern corresponding to the input security option into the scan image generated by scanning the loaded manuscript. The security option input will be described below with reference to FIG. 4.

FIG. 4 is a diagram illustrating a UI screen for inputting a security option according to an embodiment of the present disclosure.

Referring to FIG. 4, a security option UI screen 400 may include a security pattern type selection region 410, a security pattern position designation region 420, an authorship information input region 430, and a copy restriction period input region 440.

The security option UI screen 400 may be displayed through the display provided in the image reading apparatus 100 (shown in FIG. 1) and the image reading apparatus 100 may autonomously receive the security setup through the input unit provided in the image reading apparatus 100. The security option UI screen 400 may be displayed in a host apparatus coupled to the image reading apparatus 100 and the image reading apparatus 100 may receive the security setup input from the host apparatus through the communication unit 110.

For example, the type of the security pattern to be generated may be selected in the security pattern type selection region 410. The security pattern type may include a watermark type 411, a copy restriction type 412, a password type 413, and the like.

A position of the scan image in which the security pattern is to be displayed may be designated in the security pattern position designation region 420. A scan image preview 421 of the manuscript may be displayed in the security pattern position designation region 420 and the security pattern may be inserted into a position of the preview 421 selected by the user. Accordingly, the security pattern may be displayed in the position desired by the user.

An address in which the use information of the manuscript is to be received may be input in the authorship information input region 430. For example, a facsimile number 431, an e-mail address 432, and a phone number 433 may be input in the authorship information input region 430.

A period that the security operation is to be performed on the manuscript may be input in the copy restriction period input region 440.

In response to the above-described security options being input, the processor 130 may control the scanner 120 to generate the scan image by scanning the loaded manuscript and may generate the security pattern corresponding to the input security option and generate print data by inserting the security pattern into the generated scan image.

The print data generated according to an embodiment will be described with reference to FIG. 5. As an example, the generating of the print data will be described on the assumption that the security pattern type is the copy restriction type, the position of the security pattern is designated to a region 511 in which letter "A" is indicated, the e-mail address xxx@samsung.com as the authorship information is input, and the copy restriction period of from Oct. 1, 2015 to Oct. 31, 2015 is set.

Figure 5:
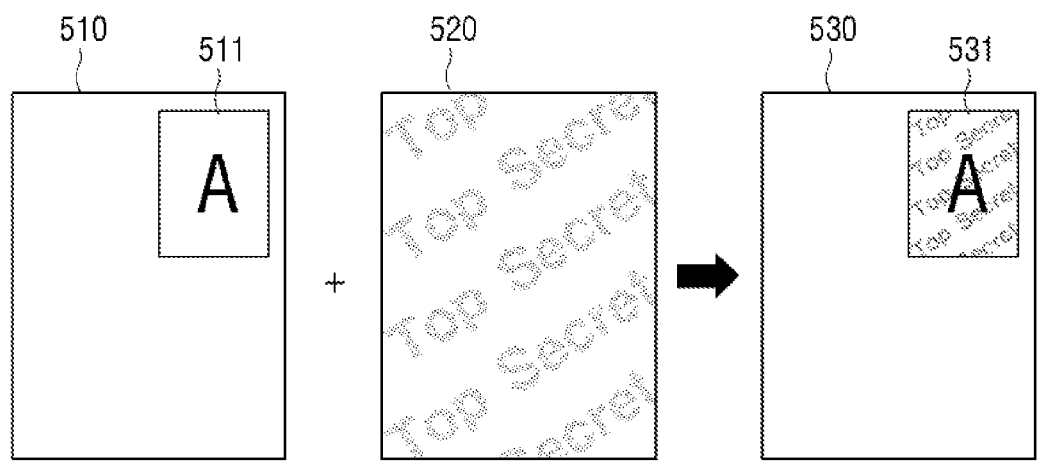
FIG. 5 is a diagram illustrating an example of print data employing a security pattern according to an embodiment of the present disclosure.

FIG. 5 is a diagram illustrating an example of print data employing a security pattern according to an embodiment of the present disclosure.

Referring to FIG. 5, the processor 130 may generate a scan image 510 by scanning a manuscript, generate a security pattern 520 corresponding to an input security option, and generate print data 530 by combining the security pattern 520 and the scan image 510.

The security pattern according to the input security option may be presented in a region 531 of the print data 530 in which A is indicated. In response to a copy that the print data 530 is output through the printer 170 being scanned through the image reading apparatus 100, the processor 130 may detect the security pattern presented in the region 531 in which letter "A" is indicated, for example, and extract copy restriction period information from the security pattern. In response to the present day, for example, being within the period of Oct. 1, 2015 to Oct. 31, 2015, the processor 130 may block the output of the scan image as the security operation corresponding to the security pattern type. The processor 130 may control the communication unit 110 to transmit the use information of the manuscript to the e-mail address of xxx@samsung.com based on the authorship information extracted from the security pattern. For example, the use information of the manuscript may include information such as a message indicating that the copying of the manuscript is blocked, a time that the image reading apparatus attempts to copy the manuscript, and a position of the image reading apparatus which attempts to copy the manuscript.

The processor 130 may not output the security pattern-inserted print data as described above in response to the toner amount available in the image reading apparatus 100 being less than a preset amount. Accordingly, the image reading apparatus 100 may prevent the abnormal printing of the security pattern due to the lack of the toner. The processor 130 may display a message indicating that the security pattern cannot be output through the display of the image reading apparatus 100.

Figure 6:
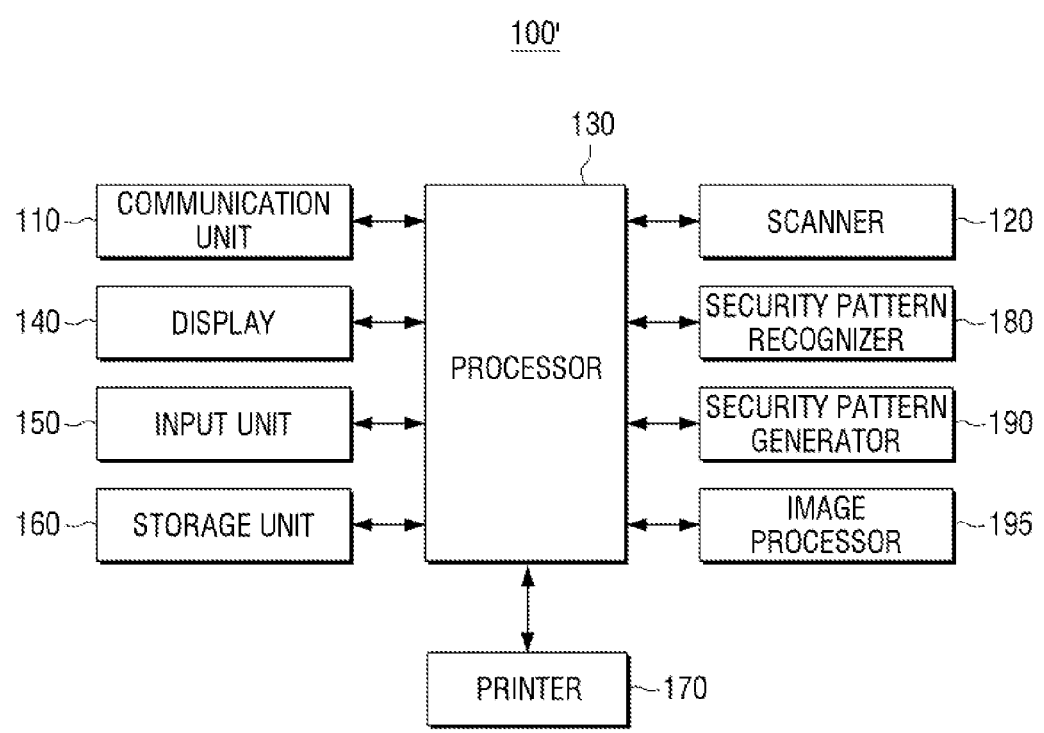
FIG. 6 is a block diagram illustrating a configuration of an image reading apparatus according to another embodiment of the present disclosure.

FIG. 6 is a diagram illustrating a configuration of an image reading apparatus according to another embodiment of the present disclosure. Detailed description for a configuration of the image reading apparatus 100' overlapping that of the image reading apparatus 100 illustrated in FIG. 1 will be omitted.

Referring to FIG. 6, an image reading apparatus 100' may include a communication unit 110, a scanner 120, a processor 130, a display 140, an input unit 150, a storage unit 160, a printer 170, a security pattern recognizer 180, a security pattern generator 190, and an image processor 195.

The communication unit 110 may be configured to perform communication with various types of external sources according to various types of communication methods. The communication unit 110 may use the various types of communication methods such as Institute of Electrical and Electronics Engineers (IEEE), Wi-Fi (e.g., IEEE 802.11 standard), Bluetooth (BT), 3rd generation (3G), 4th generation (4G), and near field communication (NFC). For example, the communication unit 110 may include various communication chips such as a Wi-Fi chip, a BT chip, a NFC chip, and a wireless communication chip. The Wi-Fi chip, the BT chip, the NFC chip, and the wireless communication chip may perform communication in a Wi-Fi manner, a BT manner, an NFC manner, and a wireless communication manner, respectively. Among the communication chips, the NFC chip may be a chip configured to operate in the NFC manner using a band of 13.56 MHz among various radio frequency identification (RF-ID) frequency bands such as 135 kHz, 13.56 MHz, 433 MHz, 860 to 960 MHz, and 2.45 GHz. In response to the Wi-Fi chip or the Bluetooth chip being used, the communication unit 110 may first transmit/receive a variety of connection information such as a service set identifier (SSID) and a session key, perform communication connection using the connection information, and transmit/receive a variety of information. The wireless communication chip may be a chip configured to perform communication according to various communication standards, such as IEEE, Zigbee, 3rd generation (3G), 3rd generation partnership project (3GPP), or long term evolution (LTE).

The scanner 120 may generate the scan image by scanning the loaded manuscript according to the control of the processor 130.

The scanner 120 may generate the scan image according to an input scan option. The scan option may be received through the input unit 150 or may be received through the communication unit 110 from a host apparatus in which a driver of the image reading apparatus 100' is installed.

The scan option may be a scan function option related to a scanning operation of the scanner 120 and may include a scan region, scan resolution, color scanning/non-color scanning one-sided/both-sided scanning, and the like.

The display 140 may display various types of information provided from the image reading apparatus 100'. The display 140 may be implemented with a monitor such as a liquid crystal display (LCD) or a cathode-ray tube (CRT). The display 140 may be implemented with a touch screen which may simultaneously perform a display function and a function of the input unit 150.

The display 140 may display a security option setup UI as described in FIG. 4 and may display a UI screen for receiving the authentication information corresponding to the detected security pattern, for example, a password.

The display 140 may display a processing status of a job which is currently processing and may display that a scanning job is completed in response to the scanning job being completed.

Referring to FIG. 6, the input unit 150 may be configured to receive various user operations. For example, the input unit 150 may include various types of function keys which set or select various functions supported in the image reading apparatus 100' through the user. The input unit 150 may be implemented with a plurality of buttons, a key board, a mouse, and the like. The input unit 150 may be implemented with a touch screen which may simultaneously perform the function of the input unit 150 and the function of the display 140.

The input unit 150 may receive an output command of the security pattern-inserted print data and may receive the security option related to the security pattern. The security option may include at least one among the security pattern type, the security pattern inserting position, the authorship information, and the copy restriction period information.

The storage unit 160 may store programs such as an operating system (O/S) and various types of data such as user setup data. For example, the storage unit 160 may store the scanned scan image and may store the print data in which the security pattern is inserted into the scan image.

The storage unit 160 may be implemented with a storage medium in the image reading apparatus 100' and an external storage medium, for example, a removable disc including a USB memory, a storage medium coupled to a host, a web server through a network, and the like.

The security pattern recognizer 180 may recognize a preset security pattern presented in the scanned scan image. The security pattern recognizer 180 may recognize the security pattern preset in the scan image, for example, by performing an OCR manner.

The security pattern generator 190 may generate the security pattern according to the input security option. For example, the security pattern generator 190 may generate various security patterns such as a watermark security pattern, a copy restriction security pattern, and a password security pattern according to the security option. The security pattern generator 190 may generate the security pattern including the input authorship information and/or copy restriction period information. The security pattern generator 190 may generate the security pattern by generating character information such as the authorship information and/or copy restriction period information in a geometrical pattern according to a preset pattern generation rule. The security pattern generator 190 may generate the security pattern in various forms such as the number, a bar code, and a quick response (QR) code. However, the type of the security pattern is not limited thereto.

The image processor 195 may synthesize the scan image generated in the scanner 120 and the security pattern generated in the security pattern generator 190. In response to the security option in which the position of the security pattern is designated being input, the image processor 195 may synthesize the security pattern with the scan image to correspond to the position of the input security pattern.

The image processor 195 may perform rendering on the job. For example, in response to the print data being received, the image processor 195 may generate image data by performing parsing and rendering on the received print data.

The image processor 195 may perform color conversion on the generated image data. For example, the image processor 195 may perform color conversion on the print data rendered through the above-described process and the scan image scanned with red (R), green (G), and blue (B) in the scanner 120 to the image data having cyan (C), magenta (M), yellow (Y), and black (K) color values.

The image processor 195 may generate the print data by synthesizing the security pattern and the scan image.

The printer 170 may output the print data in which the security pattern is inserted into the scan image.

The processor 130 may control the configuration of the image reading apparatus 100'. The processor 130 may detect the security pattern in the scan image of the manuscript and perform various security operations according to the detected security pattern.

For example, the processor 130 may control the scanner 120 to generate the scan image by scanning the loaded manuscript and control the communication unit 110 to transmit the use information of the manuscript to the address corresponding to the authorship information in response to the preset security pattern including the authorship information is detected in the generated scan image.

In this example, the processor 130 may perform a transmission operation on the use information of the manuscript just in response to the preset security pattern including the authorship information being detected. In another example, the processor 130 may perform transmission on the use information of the manuscript in response to the scan image in which the security pattern including the authorship information is presented being output through the printer 170.

The processor 130 may include a random access memory (RAM), a read only memory (ROM), a main central processing unit (CPU), various interfaces, and a bus. The RAM, the ROM, the main CPU, the various interfaces, and the like may be coupled through the bus, and may transmit and receive various types of data, signals, and the like.

First to n-th interfaces may be coupled to the components illustrated in FIG. 6 and other components and thus may allow the components to be accessed through the main CPU. For example, an external device such as a USB memory being coupled to the image reading apparatus 100', the main CPU may access the USC memory through a USB interface.

The various embodiments described herein may be implemented within a recoding medium readable by a computer or an apparatus similar to the computer using software, hardware, or a combination thereof. In the hardware implementation, the various embodiments described herein may be implemented using at least one among application specific integrated circuits (ASCIs), digital signal processors (DSPs), digital signal processing devices (DSPDs), programmable logic devices (PLDs), field programmable gate arrays (FPGAs), processors, controllers, micro-controllers, microprocessors, and electrical units for performing other functions. Some of the various embodiments described herein may be implemented with the processor 130 itself. In the software implementation, the various embodiments such as a procedure and a function described herein may be implemented with separate software modules. Each of the software modules may perform one or more functions and operations described herein.

Figure 7:
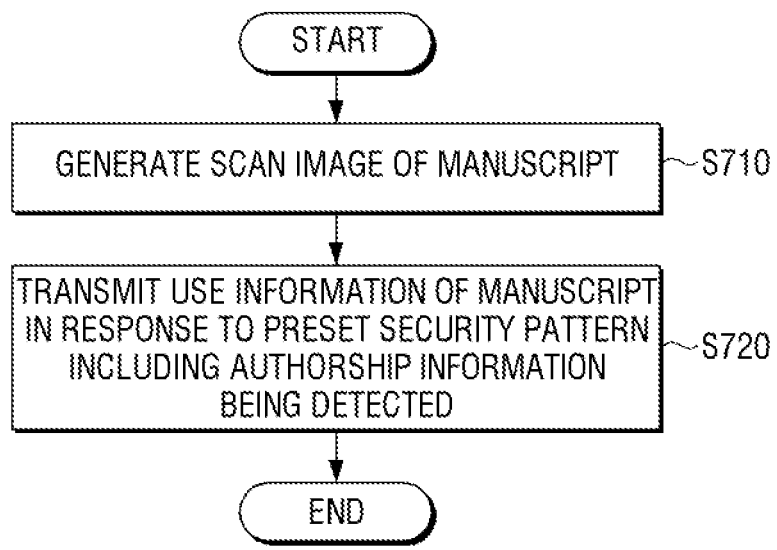
FIGS. 7, 8, 9, 10, and 11 are flowcharts illustrating control methods of an image reading apparatus according to various embodiments of the present disclosure.

FIG. 7 is a flowchart illustrating a control method of an image reading apparatus according to an embodiment of the present disclosure.

Referring to FIG. 7, the image reading apparatus may generate a scan image by scanning a manuscript at operation S710. In response to a preset security pattern including authorship information being detected in the generated scan image, the image reading apparatus may transmit use information of the manuscript to an address corresponding to the authorship information at operation S720.

The use information of the manuscript may include at least one among information for the manuscript, information for a user using the manuscript, information for a use time of the manuscript, information for the image reading apparatus which performs scanning of the manuscript, information for indicating whether or not a copy of the manuscript is created, and information for the number of copies of the manuscript.

The use information of the manuscript may be transmitted through various methods. For example, the use information of the manuscript may be transmitted to the authorship through the various methods such as facsimile transmission, e-mail transmission, text message transmission (for example, short message service (SMS) or multi-media message service (MMS)), or instant message transmission.

The transmitted use information of the manuscript may be determined through various methods. In response to the use information of the manuscript being transmitted through e-mail, the authorship may determine the use information of the manuscript in his/her own e-mail account. In response to the use information of the manuscript being transmitted through a facsimile, the use information of the manuscript may be received in the facsimile of the authorship. In response to the use information of the manuscript being transmitted through a text message, the authorship may determine the use information of the manuscript in his/her own smart phone and the like.

The use information of the specific manuscript may be statistically provided. For example, the authorship may determine the statistic information indicating how many times the specific manuscript is to be used for a specific period by executing an application of his/her own smart phone.

The use information of the manuscript may provide notification of the authorship in response to when the scanning of the manuscript is attempted or in response to when a scanning result of the manuscript is output.

The operation of performing a security operation corresponding to the type of the detected security pattern may be performed.

In response to copy restriction period information being included in the detected security pattern, the security operation may be performed only in the period corresponding to the copy restriction period information.

In response to the detected security pattern being a first type, the scan image may not be output. In response to the detected security pattern being a second type, the scan image in which a density of the security pattern is darker may be output. In response to the detected security pattern being a third type, the scan image may be output in response to authentication information corresponding to the detected security pattern being input. The terms "first type", "second type", and "third type" may refer to terms different types of the security patterns.

In response to the detected security pattern being the third type, a UI screen for receiving the authentication information may be displayed.

The image reading apparatus may receive a security option related to the generation of the security pattern, generate the security pattern, and generate printing data by inserting the security pattern into the scan image. The generated print data may be output through the printer. Since the security pattern has to be output to be recognizable in the image reading apparatus, the output of the print data may be blocked in response to a toner concentration available in the image reading apparatus being low. Accordingly, the creation of a document including an unrecognizable security pattern may be fundamentally blocked, and thus the document security may be further enhanced.

Figure 8:
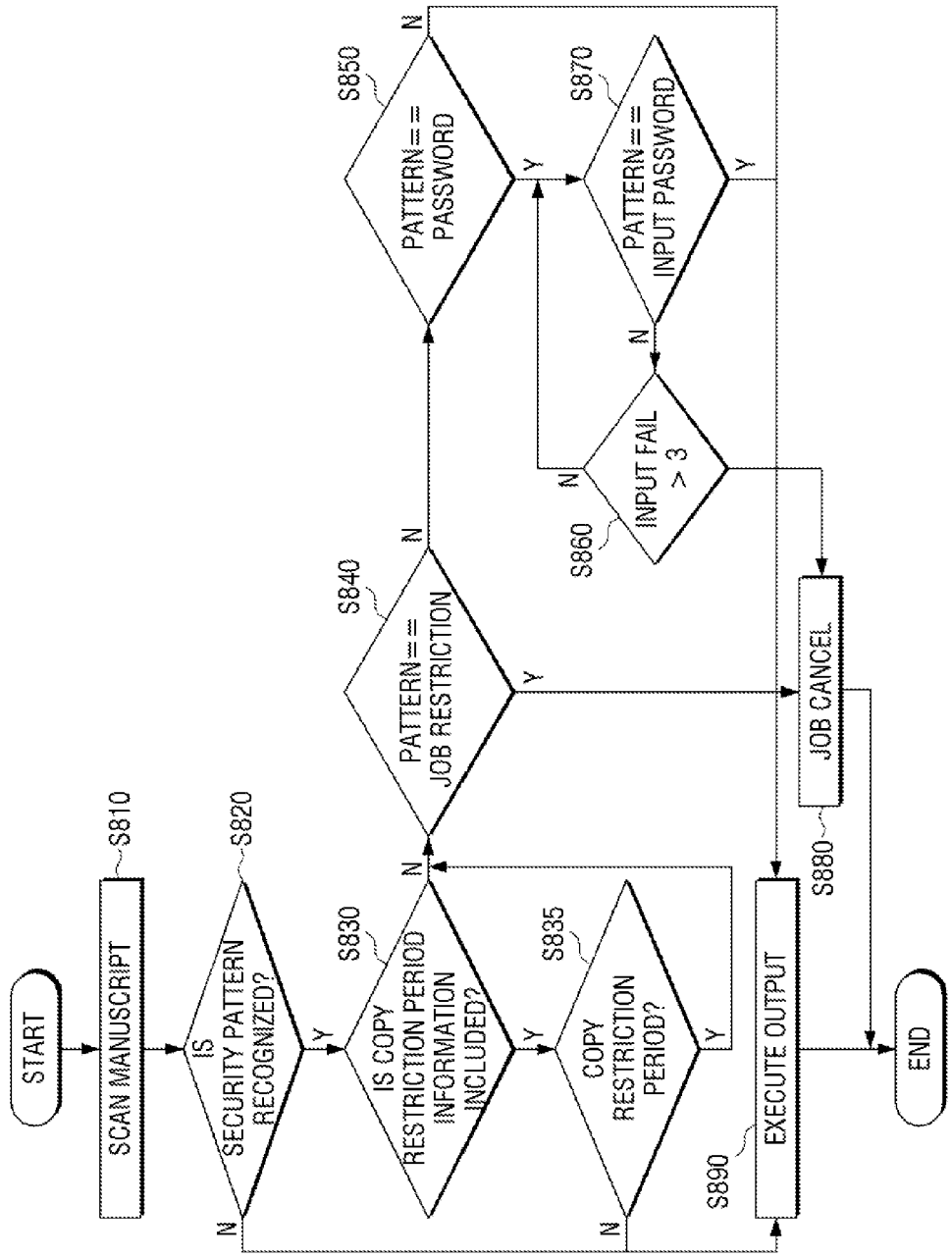

FIG. 8 is a flowchart illustrating a security operation of an image reading apparatus according to an embodiment of the present disclosure.

Referring to FIG. 8, the image reading apparatus may generate a scan image by scanning a manuscript at operation S810.

The image reading apparatus may determine whether or not a security pattern is presented in the generated scan image at operation S820. The image reading apparatus may execute outputting of the scan image in response to the security pattern not being recognized at operation S890 and may determine whether or not copy restriction period information is included in the security pattern in response to the security pattern being recognized at operation S830.

The image reading apparatus may determine whether or not today is within a copy restriction period in response to the copy restriction period information being included at operation S835. The image reading apparatus may execute the outputting of the scan image in response to today not being within the copy restriction period at operation S890.

The image reading apparatus may determine whether or not a type of the security pattern is a copy restriction type at operation S840 in response to today being within the copy restriction period in operation S835 or in response to the copy restriction period information not being included in operation S830. The image reading apparatus may cancel a corresponding job in response to the type of the security pattern being the copy restriction type at operation S880. For example, the image reading apparatus may block the outputting of the scan image. In this example, the generated scan image may be deleted from the storage unit of the image reading apparatus.

The image reading apparatus may determine whether or not the type of the security pattern is a password type in response to the type of the security pattern not being the copy restriction type at operation S850. The image reading apparatus may determine that the security pattern is a watermark type and execute the outputting of the scan image in response to the type of the security pattern not being the password type at operation S890. A copy in which the security pattern is more darkly represented than the original may be output.

The image reading apparatus may receive a password and determine whether or not the password is corresponding to the security pattern in response to the type of the security pattern being the password type at operation S870. The image reading apparatus may count the number of wrong password input in response to the wrong password being input at operation S860. The image reading apparatus may cancel the job in response to the number of wrong password input being larger than a preset number at operation S880. The image reading apparatus may execute the outputting of the scan image in response to the correct password is input at operation S890. It has been described in FIG. 8 that the image reading apparatus cancels the job in response to the number of wrong password input being larger than three, but this is not limited thereto.

According to the embodiment, the security operation may be performed only in a specific period according to copy restriction period information included in the security pattern, and thus the probability that the manuscript may be managed with various security intentions may be provided.

Figure 9:
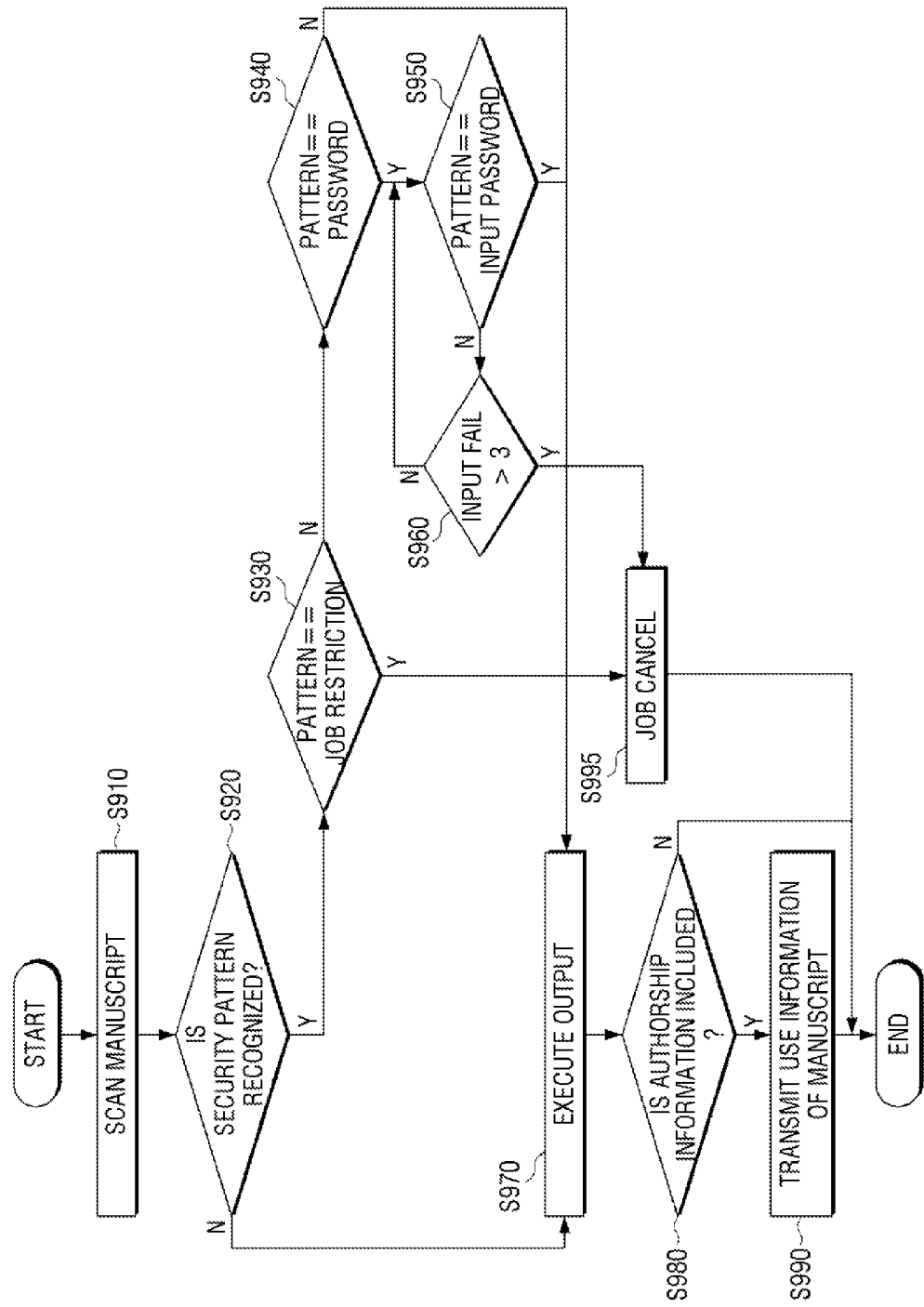

FIG. 9 is a flowchart illustrating a security operation of an image reading apparatus according to another embodiment of the present disclosure.

Referring to FIG. 9, the image reading apparatus may generate a scan image by scanning a manuscript at operation S910.

The image reading apparatus may determine whether or not a security pattern is presented in the generated scan image at operation S920. The image reading apparatus may execute outputting of the scan image in response to the security pattern not being recognized at operation S970 and may determine whether or not a type of the security pattern is a copy restriction type in response to the security pattern being recognized at operation S930. The image reading apparatus may cancel a corresponding job in response to the type of the security pattern being the copy restriction type at operation S995. For example, the image reading apparatus may block the outputting of the scan image. In this example, the generated scan image may be deleted from the storage unit of the image reading apparatus.

The image reading apparatus may determine whether or not the type of the security pattern is a password type in response to the type of the security pattern not being the copy restriction type at operation S940. The image reading apparatus may determine that the security pattern is a watermark type and execute the outputting of the scan image in response to the type of the security pattern not being the password type at operation S970. A copy in which the security pattern is more darkly represented than the original may be output.

The image reading apparatus may receive a password and determine whether or not the password is corresponding to the security pattern in response to the type of the security pattern being the password type at operation S950. The image reading apparatus may count the number of wrong password input in response to the wrong password being input at operation S960. The image reading apparatus may cancel the job in response to the number of wrong password input being larger than a preset number at operation S995. The image reading apparatus may execute the outputting of the scan image in response to the correct password being input at operation S970. It has been described in FIG. 9 that the image reading apparatus cancels the job in response to the number of wrong password input being larger than three, but this is not limited thereto.

After the outputting is executed at operation S970, the image reading apparatus may determine whether or not authorship information is included in the security pattern at operation S980. The image reading apparatus may transmit use information of the manuscript to an address corresponding to the authorship information in response to the authorship information being included at operation S990.

According to the embodiment, after the document including the security pattern is output, the image reading apparatus may automatically notify the authorship of the document of the copying of the document.

Figure 10:
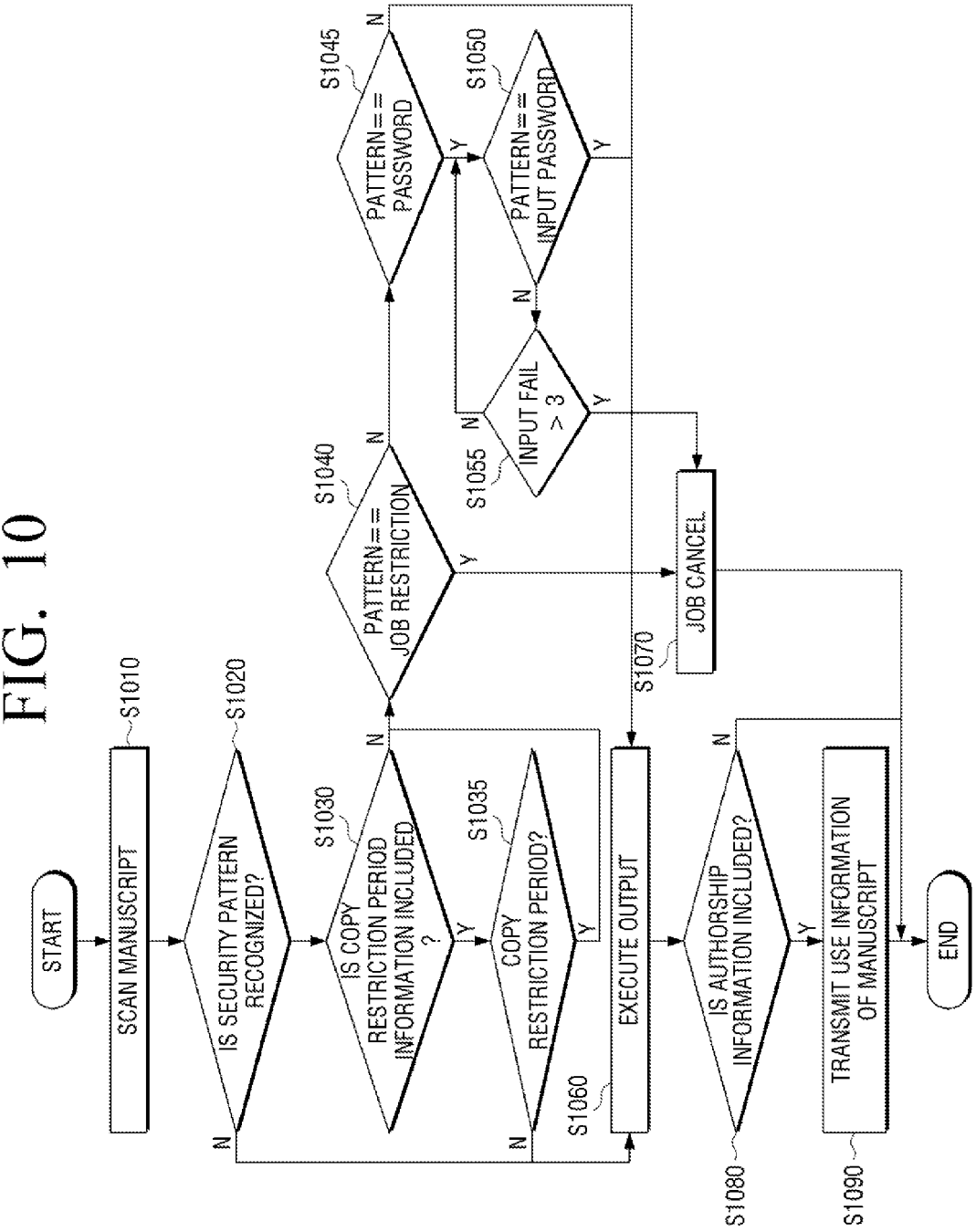

FIG. 10 is a flowchart illustrating a security operation of an image reading apparatus according to another embodiment of the present disclosure.

Referring to FIG. 10, the image reading apparatus may generate a scan image by scanning a manuscript at operation S1010.

The image reading apparatus may determine whether or not a security pattern is presented in the generated scan image at operation S1020. The image reading apparatus may execute outputting of the scan image in response to the security pattern not being recognized at operation S1060 and may determine whether or not copy restriction period information is included in the security pattern in response to the security pattern being recognized at operation S1030.

The image reading apparatus may determine whether or not today is within a copy restriction period in response to the copy restriction period information being included at operation S1035. The image reading apparatus may execute the outputting of the scan image in response to today not being within a copy restriction period at operation S1060.

The image reading apparatus may determine whether or not a type of the security pattern is a copy restriction type at operation S1040 in response to today being within the copy restriction period in operation S1035 or in response to the copy restriction period information not being included in operation S1030. The image reading apparatus may cancel a corresponding job in response to the type of the security pattern being the copy restriction type at operation S1070. For example, the image reading apparatus may block the outputting of the scan image. In this example, the generated scan image may be deleted from the storage unit of the image reading apparatus.

The image reading apparatus may determine whether or not the type of the security pattern is a password type in response to the type of the security pattern not being the copy restriction type at operation S1045. The image reading apparatus may determine that the security pattern is a watermark type and execute the outputting of the scan image in response to the type of the security pattern not being the password type at operation S1060. A copy in which the security pattern is more darkly represented than the original may be output.

The image reading apparatus may receive a password and determine whether or not the password is corresponding to the security pattern in response to the type of the security pattern being the password type at operation S1050. The image reading apparatus may count the number of wrong password input in response to the wrong password being input at operation S1055. The image reading apparatus may cancel the job in response to the number of wrong password input being larger than a preset number at operation S1070. The image reading apparatus may execute the outputting of the scan image in response to the correct password being input at operation S1060. It has been described in FIG. 10 that the image reading apparatus cancels the job in response to the number of wrong password input being larger than three, but this is not limited thereto.

After the outputting is executed at operation S1060, the image reading apparatus may determine whether or not authorship information is included in the security pattern at operation S1080. The image reading apparatus may transmit use information of the manuscript to an address corresponding to the authorship information in response to the authorship information being included at operation S1090.

According to the embodiment, the security operation may be performed only in a specific period according to copy restriction period information included in the security pattern, and thus the probability that the manuscript may be managed with various security intentions may be provided. In response to the document including the security pattern being output, the image reading apparatus may automatically notify the authorship of the document of the copying of the document.

It has been described in the embodiment of FIG. 10 that the image reading apparatus notifies the authorship of the copying of the document even in response to today not being within the copy restriction period, as an example without being limited therefore. For example, in another embodiment, even in response to the copy being output, the image reading apparatus may not notify the authorship of the copying of the document in response to today not being within the copy restriction period.

It has been described in the various embodiments of FIGS. 8, 9, and 10 that the job is only a scan image output job, but the various embodiments may be applied to various jobs using the scan image. For example, other than the output execution job in operation S970 of FIG. 9, various jobs such as a facsimile transmission job and a scan image storage job may be performed.

Figure 11:
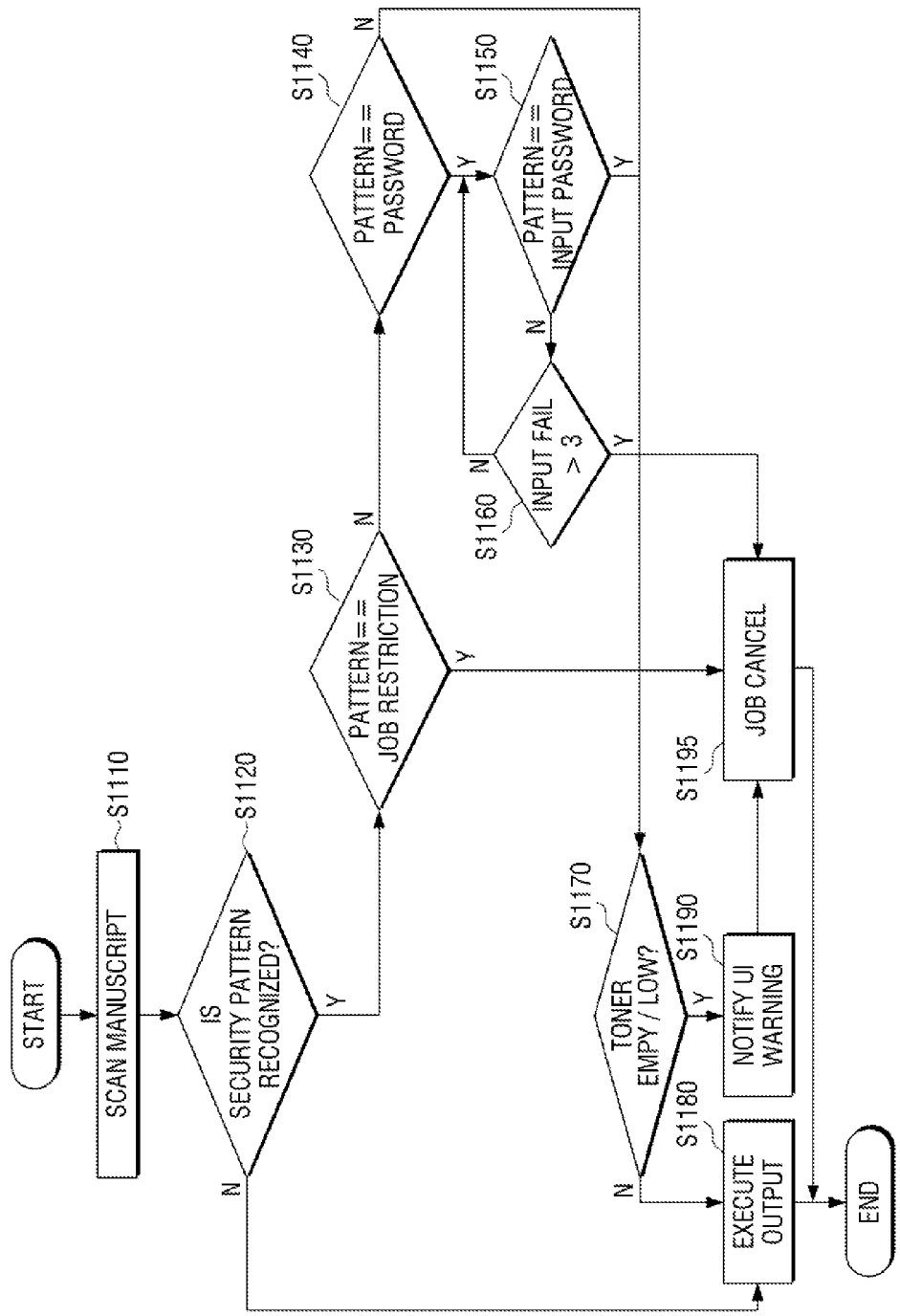

FIG. 11 is a flowchart illustrating a security operation of an image reading apparatus according to another embodiment of the present disclosure.

Referring to FIG. 11, the image reading apparatus may generate a scan image by scanning a manuscript at operation S1110.

The image reading apparatus may determine whether or not a security pattern is presented in the generated scan image at operation S1120. The image reading apparatus may execute outputting of the scan image in response to the security pattern not being recognized at operation S1180 and may determine whether or not a type of the security pattern is a copy restriction type in response to the security pattern being recognized at operation S1130. The image reading apparatus may cancel a corresponding job in response to the type of the security pattern being the copy restriction type at operation S1195. For example, the image reading apparatus may block the outputting of the scan image. In this example, the generated scan image may be deleted from the storage unit of the image reading apparatus.

The image reading apparatus may determine whether or not the type of the security pattern is a password type in response to the type of the security pattern not being the copy restriction type at operation S1140. The image reading apparatus may determine that the security pattern is a watermark type and determine whether or not a toner amount available in the image reading apparatus is less than a preset amount in response to the type of the security pattern not being the password type at operation S1170. The image reading apparatus may notify the authorship of a UI warning at operation S1190 in response to the toner amount being less than the preset amount and then cancel the job at operation S1195. The UI warning may be displayed in the display of the image reading apparatus. The image display apparatus may execute the outputting of the scan image in response to the toner amount being larger than the preset amount at operation S1180. A copy in which is more darkly represented than the original security pattern may be output.

The image reading apparatus may receive a password and determine whether or not the password is corresponding to the security pattern in response to the type of the security pattern being the password type at operation S1150. The image reading apparatus may count the number of wrong password input in response to the wrong password being input at operation S1160. The image reading apparatus may cancel the job in response to the number of wrong password input being larger than a preset time at operation S1195. The image reading apparatus may determine whether or not the toner amount available in the image reading apparatus is less than the preset amount in response to the correct password being input at operation S1170. The image reading apparatus may notify the authorship of the UI warning at operation S1190 in response to the toner amount being less than the preset amount and then cancel the job at operation S1195. The image reading apparatus may execute the outputting of the scan image in response to the toner amount being larger than the preset amount at operation S1180. It has been described in FIG. 11 that the image reading apparatus cancels the job in response to the number of wrong password input being larger than three, but this is not limited thereto.

According to the embodiment, the security pattern which is blurredly printed may be prevent from not being recognized in the image reading apparatus, and thus the security of the document may be further enhanced.

The methods according to the above-described embodiments may be implemented with software and installed in an electronic apparatus.

For example, a non-transitory computer readable medium, in which a program for executing the operations of generating a scan image by scanning a manuscript and transmitting use information of the manuscript to an address corresponding to authorship information in response to a preset security pattern including the authorship information being detected in the scan image is stored, may be provided.

The non-transitory computer-readable medium is not a medium configured to temporarily store data such as a register, a cache, or a memory but an apparatus-readable medium configured to permanently or semi-permanently store data. For example, various applications or programs may be stored in the non-transitory apparatus-readable medium such as a compact disc (CD), a digital versatile disc (DVD), a hard disc, a Blu-ray disc, a USB, a memory card, or a ROM, and provided While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An image reading apparatus comprising:
a communication device;
a scanner configured to generate a scan image by scanning a manuscript; and
at least one processor configured to control the communication device to transmit use information of the manuscript to an address corresponding to authorship information in response to a preset security pattern including the authorship information being detected in the generated scan image,
wherein the at least one processor is further configured to perform a security operation only in a period corresponding to copy restriction period information included in the detected security pattern.

2. The image reading apparatus as claimed in claim 1, wherein the use information of the manuscript includes at least one among information for the manuscript, information for a user using the manuscript, information for a use time of the manuscript, information for the scanner, information for indicating whether or not a copy of the manuscript is created, and information for a number of copies of the manuscript.

3. The image reading apparatus as claimed in claim 1, further comprising a printer configured to output the scan image,
wherein the at least one processor is further configured to transmit the use information of the manuscript in response to the scan image in which the preset security pattern including the authorship information is being output through the printer.

4. The image reading apparatus as claimed in claim 1, further comprising a printer configured to output the scan image,
wherein the at least one processor is further configured to control the printer to:
output no scan image in response to a first type of the detected security pattern,
output the scan image in which a density of the security pattern is darker in response to a second type of the detected security pattern, and
output the scan image in response to a third type of the detected security pattern and authentication information corresponding to the detected security pattern being input.

5. The image reading apparatus as claimed in claim 4, further comprising a display configured to display a user interface (UI) screen for receiving the authentication information,
wherein the at least one processor is further configured to control the display to display the UI screen in response to the third type of the detected security pattern.

6. The image reading apparatus as claimed in claim 1, wherein the address includes at least one among an internet protocol (IP) address, a media access control (MAC) address, an electronic mail (e-mail) address, and a phone number.

7. The image reading apparatus as claimed in claim 1, further comprising:
an input device configured to receive a security option; and
a printer configured to output print data,
wherein the at least one processor is further configured to:
generate the print data by inserting the preset security pattern corresponding to the received security option into the scan image generated by scanning a loaded manuscript, and
control the printer to output the generated print data.

8. The image reading apparatus as claimed in claim 7, wherein the security option includes at least one among a security pattern type, a security pattern inserting position, the authorship information, and copy restriction period information.

9. The image reading apparatus as claimed in claim 7, wherein the at least one processor is further configured to output no generated print data in response to a toner amount available in the image reading apparatus being less than a preset amount.

10. A method of controlling an image reading apparatus, the method comprising:
generating a scan image by scanning a manuscript;
transmitting use information of the manuscript to an address corresponding to authorship information in response to a preset security pattern including the authorship information being detected in the scan image; and
performing a security operation corresponding to a type of the detected security pattern,
wherein the performing of the security operation includes performing the security operation only in a period corresponding to copy restriction period information included in the detected security pattern.

11. The method as claimed in claim 10, wherein the use information of the manuscript includes at least one among information for the manuscript, information for a user using the manuscript, information for a use time of the manuscript, information for the scanner, information for indicating whether or not a copy of the manuscript is created, and information for the number of copies of the manuscript.

12. The method as claimed in claim 10, wherein the transmitting of the use information includes transmitting the use information of the manuscript in response to the scan image in which the preset security pattern including the authorship information is being output through a printer of the image reading apparatus.

13. The method as claimed in claim 10, wherein the performing of the security operation includes outputting no scan image in response to a first type of the detected security pattern, outputting the scan image in which a density of the security pattern is darker in response to a second type of the detected security pattern, and outputting the scan image in response to a third type of the detected security pattern and authentication information corresponding to the detected security pattern being input.

14. The method as claimed in claim 13, wherein the performing of the security operation includes displaying a user interface (UI) screen for receiving the authentication information in response to the third type of the detected security pattern.

15. The method as claimed in claim 10, further comprising:
receiving a security option;
generating print data by inserting the preset security pattern corresponding to the received security option into the scan image generated by scanning a loaded manuscript; and
outputting the generated print data.

16. A non-transitory computer-readable recording medium having recorded thereon at least one program comprising commands, which when executed by a computer, performs a method of controlling an image reading apparatus, the method comprising:
generating a scan image by scanning a manuscript;
transmitting use information of the manuscript to an address corresponding to authorship information in response to a preset security pattern including the authorship information being detected in the scan image; and
performing a security operation corresponding to a type of the detected security pattern,
wherein the performing of the security operation includes performing the security operation only in a period corresponding to copy restriction period information included in the detected security pattern.

* * * * *